United States Patent Office 2,906,667
Patented Sept. 29, 1959

2,906,667

PREPARATION AND PURIFICATION OF CORTICOTROPHIN (ACTH)

Kenneth W. McKerns, Smith Falls, Ontario, Canada, assignor to Canada Packers, Limited, Toronto, Ontario, Canada Application August 21, 1956, Serial No. 605,256

14 Claims. (Cl. 167—74)

This invention relates to the preparation of an adrenocorticotrophic hormone substance, and more particularly to an improved process for the isolation and purification of corticotrophin (ACTH) from the anterior lobes of the pituitary glands of hogs, cattle, sheep, or other animals.

The primary object of this invention is to provide a process for obtaining high yields of corticotrophin of good quality from animal pituitary glands.

Another object of the invention is to provide an improving process for isolating a crude corticotrophic substance from animal pituitary glands with substantially no loss of corticotrophin values.

A further object of the invention is to provide an improved process for purification of crude corticotrophin whereby a product of high potency can be obtained in high yield from the crude material.

Another object of the invention is to provide an improved extraction procedure whereby separation of the corticotrophin extract from the relatively insoluble proteins of the pituitary glands is facilitated.

Another object of the invention is to provide a process for the isolation of corticotrophin from animal pituitaries in which oxidation of the corticotrophic substance is avoided and in which enzymes tending to destroy the corticotrophic substance are denatured at an early stage of the process, whereby high yields of corticotrophin may be obtained.

A further object of the invention is to provide an improved method for selectively removing blood pigments from a corticotrophin extract in a process for the isolation of corticotrophin from animal pituitaries.

A still further object of the invention is to provide an improved method for precipitating corticotrophin values from an extract of animal pituitaries which effects a highly selective separation of the corticotrophic substance from other hormones and principles of the pituitary.

Another object of the invention is to provide a process for obtaining light colored crude and purified corticotrophic products in high yield from animal pituitaries.

These and other objects and advantages which will become apparent from the ensuing description are accomplished by the present invention, which, briefly, comprises: extracting fresh or acetone-dried pituitary glands with an aqueous medium containing about 65 to 80% acetone or ethanol at a pH of about 1.5 and at the reflux temperature of the solvent; separating the solution from the proteinaceous residue; treating the resultant solution at a pH below about 2.0 with decolorizing charcoal, which has been treated to insure reducing conditions, to thereby selectively remove blood pigments; adding an aqueous solution of a zinc salt to the decolorized extract; gradually raising the pH of the resulting solution to about 4.45 to precipitate growth hormone and other principles of the pituitary; separating the supernatant solution from the precipitate; gradually increasing the pH of said solution to about pH 5.9 to precipitate crude corticotrophin as a zinc complex; removing the zinc complex of corticotrophin from solution; dissolving the said corticotrophin complex in acid solution and adjusting the pH of said solution to about 3.5 to 4.5; adsorbing the active corticotrophin from the acid solution upon a mixture of oxycellulose and carboxylic acid cation exchange resin; eluting the adsorbed corticotrophin from said mixture of adsorbents with a dilute acid solution; and precipitating the corticotrophin from such solution by means of an organic solvent. The resultant purified corticotrophic product is obtained in much higher yields than obtainable by any process heretofore known. The product is of excellent quality, is substantially colorless, and exhibits a potency at least as high and in some instances much higher than that of corticotrophin obtained by previously known acid-acetone extraction and oxycellulose adsorption techniques.

The animal pituitary glands to be extracted may be either fresh or in acetone-dehydrated form. Since the pituitary glands contain enzymes which destroy corticotrophin, it is important that the enzyme activity be checked as soon as the glands are removed from the animal. Accordingly, if the fresh glands are not immediately dehydrated or processed as herein described, they are frozen solid, and are kept in frozen condition until ready for use. The frozen glands may then be ground, dehydrated in acetone, and immediately extracted by the procedure described herein. Fresh glands may be minced and extracted immediately without dehydration or defatting.

The active corticotrophic material is extracted from the fresh or dehydrated pituitaries in a solvent medium which preferably contains about 65 to 80 percent of acetone or ethanol, and which has been adjusted to a pH range between about 1.5 and 3—preferably about 1.5, by the addition of a strong mineral acid such as HCl or an organic acid such as glacial acetic. The concentration of organic solvent in the extraction medium is higher than that used in the previously known cold acetone-acid technique.

The use of high temperatures during the extraction operation in conjunction with the high acetone or ethanol concentration has been found to be important in obtaining high yields of corticotrophin. Extraction at the reflux temperature of the solvent medium is preferred. The use of such temperatures facilitates the coagulation and separation of the inert proteins. Corticotrophin is not as sensitive to heat denaturization as are the inert proteins of the pituitary, and consequently partial heat denaturization of the proteins at the temperatures involved lowers the already slight solubility of the inert proteins in the extraction medium. The native proteins of the pituitary are slimy and very difficult to filter, whereas the heat-denatured and coagulated inert proteins separate cleanly, and may be readily centrifuged or filtered from the extract. The subsequent decolorization step with charcoal is made more effective in that less charcoal is required, and color removal is made much more complete.

Another advantage in the use of refluxing temperatures in the extraction step resides in the inactivation of corticotrophin-destructive enzymes at an early stage of the process. The refluxing solvent tends to denature the enzymes contained in the pituitary glands so that any enzyme action upon the corticotrophin activity is checked. It has been found that corticotrophin is quite susceptible to oxidation. In the present process, the refluxing solvent blankets the extraction mixture with solvent vapors, thereby excluding oxygen. Accordingly, in the present extraction procedure very little corticotrophin activity is lost by oxidation or by enzyme activity.

The pH of the extraction medium has also been found to be critical in obtaining high yields. A pH in the range of from about 1 to 3 may be used, but a pH of about 1.5 is preferred. While this pH is lower than usually used in the conventional cold acid-acetone extraction procedure, it has been found that in the presence of so much other protein, and with the high organic solvent concentration, little, if any, hydrolysis of the corticotrophin occurs. The high hydrogen ion concentration at this stage serves merely to dissociate the polypeptide corticotrophin from its parent protein. However, the boiling of purified corticotrophin in HCl leads to hydrolysis and to a type of corticotrophin not considered desirable in that it is rapidly absorbed and inactivated in clinical use. It is therefore important that high temperatures be utilized only during the initial extraction stage.

The improvement in extraction procedure therefore resides in the novel combination of high acetone or ethanol concentration, use of reflux temperatures, and low extraction pH, all of which contribute toward the recovery of substantially all of the corticotrophin values of the pituitary glands in the crude extract.

After extraction of the corticotrophin from the ground pituitaries with the acid-solvent mixture and coagulation of the proteins, the mass is cooled to room temperature or below, the supernatant solution containing the corticotrophin activity is poured off or centrifuged and is then decolorized with charcoal in order to effect complete removal of blood pigments. It has been found to be most important to remove the blood pigments early in the purification procedure. Hemoglobin or myoglobin oxidizes readily to dark brown and later to green pigments, which are very difficult to remove without loss of corticotrophic hormone activity.

The pH of the solution during the decolorizing operation is very important, since as the pH rises above about 2, corticotrophin is more and more readily bound to the charcoal. Heretofore, it has not been known that charcoal could be utilized for purification of corticotrophin solution. Charcoal has a great affinity for all proteins, and would be expected to adsorb all of the proteins including corticotrophin from solution in an unspecific manner. It has now been found that if the decolorization is carried out at a pH below 2, the charcoal has a selective adsorption affinity for the blood pigments and proteins other than corticotrophin. In order to prevent oxidation of the corticotrophin during the decolorization stage, the decolorizing charcoal is initially treated with $H_2S$ or other reducing gas to eliminate the possibility that the charcoal will be a carrier of oxygen. The charcoal utilized may be any good commercial grade of decolorizing charcoal. That obtainable on the market under the trade name "Darco-KB" has been satisfactorily used.

After adsorption of the pigments, the bulk of the charcoal is removed from the corticotrophin solution by centrifugation. All separations are preferably made at low temperatures for example, room temperature or below. The last traces of charcoal are swept out by the subsequent further precipitation of undesired proteins by complexing with a zinc salt at a pH below 4.45.

The zinc salt utilized to selectively precipitate certain of the remaining proteins below pH 4.45 and to precipitate the corticotrophin in a slightly higher pH range, may be any water-soluble zinc salt such as the acetate or chloride, and may be added to the solution resulting from the decolorizing operation in the form of a dilute aqueous solution. The undesired protein fraction and corticotrophic hormone are separately precipitated as zinc complexes during step-wise increase in the pH of the solution. The zinc salt, for example zinc acetate in aqueous solution, is slowly added to the decolorized extract, after which the pH of the solution is gradually raised by the addition of a suitable aqueous alkaline solution, with continuous agitation of the extract during such addition. A 1 N. solution of NaOH may be used for this purpose. The pH of the solution is gradually raised to 4.45 in a first step, after which the resulting zinc-complex precipitate of proteins including growth hormone and thyrotropic hormone is separated by centrifugation or the like. The pH limit of 4.45 at this stage is very critical in ensuring the obtaining of high yields of corticotrophin in the next stage. For example, an increase in pH to about pH 4.75 will result in loss of about one-half of the corticotrophic hormone with the first zinc-complex protein precipitate.

After separation of the first zinc-complex protein precipitate, the pH of the solution is then gradually increased by further addition of alkaline solution with constant agitation, until a pH of about 5.85 is reached. The latter pH is not as sharply critical as the lower pH value, but care should be taken not to increase the pH to the extent that hydroxides are formed from the zinc salt. This occurs at about pH 6.8. The active corticotrophic hormone precipitates almost quantitatively in the range of pH 4.45 to pH 5.85. The solution at pH 5.85 may be left to stand in the cold, 0° C., for a substantial period of time in order to insure complete precipitation of the corticotrophic hormone. The precipitate is then collected by centrifugation at a low temperature. The recovered crude corticotrophin precipitate may be freed of mother liquor by suspending it in acetone, filtering and rewashing with acetone, after which the air-dried material provides a crude corticotrophic substance having a yield of approximately 25 grams from 100 grams of the acetone-dried anterior lobes constituting the starting material. The crude corticotrophin is a white powder, readily soluble in dilute acid, and having a potency of between 1 and 3 I.U. per mg. assayed by the method reported by McKearns and Norstand in "Canadian Journal of Biochemistry and Physiology," vol. 33, pp. 681–686 (1955).

In order to purify the crude material, a portion of the crude substance is dissolved in 0.1 N acetic acid, and the pH is lowered to 3.5 to 4.5 by the addition of glacial acetic acid and/or HCl. The solution is filtered, the corticotrophin is then adsorbed on an acid-regenerated mixture of oxycellulose and cation exchange resin having functional carboxylic acid groups. While any of a number of adsorption techniques may be used, the corticotrophin containing solution preferably is added to a slurry of the oxycellulose and carboxylic type resin in 0.1 N acetic acid. The slurry is agitated for a prolonged period at room temperature in order to permit complete adsorption of the corticotrophin hormone principle. The adsorption is carried out at pH 3.5 to 4.5.

It has been previously known that corticotrophin could be adsorbed upon oxycellulose or upon ion exchange resins and in one instance it has been proposed to utilize such adsorbents in sequence. It has now been found that the use of a mixture of the ion exchange resin and the oxycellulose does not behave exactly like either one but possesses a stronger adsorptive power for corticotrophin suggestive of synergistic action. The binding of the corticotrophin to the mixture of the adsorbents is much firmer than to either alone. For example, two hours of elution or agitation with 0.1 N HCl upon oxycellulose-bound corticotrophin will elute most of the activity, whereas two hours elution under similar conditions with the mixture of oxycellulose and carboxylic acid type resin presently used will elute no corticotrophin activity.

The firmer binding capacity of the adsorbent mixture results in higher yields from the dissolved crude, and further protects the purified corticotrophin from denaturization during purification. Substantially complete recovery of corticotrophin from the crude starting material is obtained, without sacrifice of purity or potency.

The carboxylic acid type ion exchange resins may be any of the commercially available synthetic resin materials having carboxylic acid groups attached to the molecule. Such resins are typified by and include those described in U.S. Patents 2,340,110 and 2,340,111 to D'Alelio. Those marketed by Rohm & Haas under the designations of "Amberlite IRC-50" or "Amberlite XE-97" have been successfully used. The oxycellulose should be of freshly-activated type, and preferably is mixed with the carboxylic acid cation exchange resin in about 1-to-1 proportions by weight. In general, satisfactory results may be obtained by using from about 40 to 60% by weight of resin in the mixture. Improved results over either adsorbent alone are obtained, however, with a wide range of proportions. The carboxylic acid cation exchange resin preferably is freshly activated to the hydrogen form prior to mixing with the oxycellulose, by treating it with dilute acid solution. Time should be allowed for the resin to become thoroughly hydrated, after which it is mixed with the oxycellulose.

The importance of pH in the adsorption of the corticotrophin from solution with the mixed adsorbents is illustrated by reference to the accompanying drawing, wherein.

Figure 1:
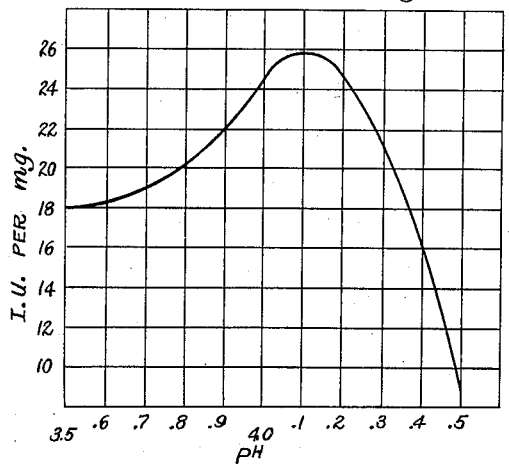
Fig. 1 is a graph obtained by plotting the activity of the adsorbed corticotrophin material against the pH of the solution from which it was adsorbed.
Figure 2:
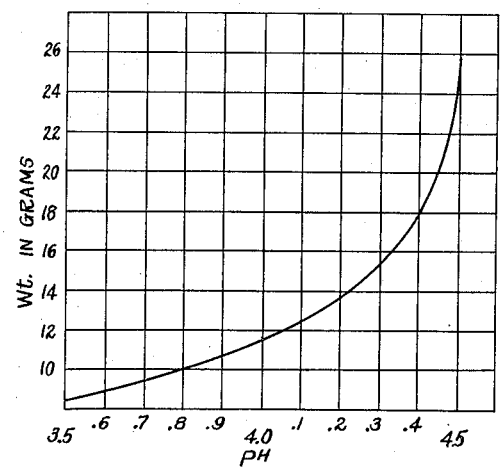
Fig. 2 is a graph plotting the weight of the adsorbed corticotrophin material against the pH of the solution from which it was adsorbed.
Figure 3:
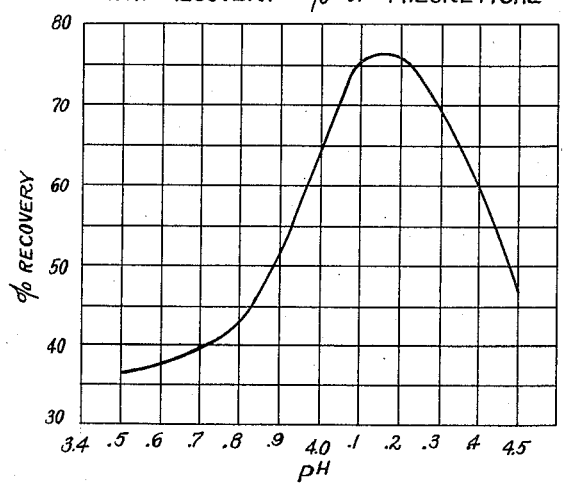
Fig. 3 is a graph combining the results of the first two graphs to thereby indicate the percent recovery of corticotrophin with relation to the pH of the solution from which it was adsorbed.

It will be observed from Fig. 1 that the activity of the recovered corticotrophin in Standard International Units per milligram goes up gradually from pH 3.5, reaching a maximum at pH about 4.1, after which it declines rapidly to pH 4.5. On the other hand, as may be observed from Fig. 2, the weight of the material adsorbed continues to go up at an increasing rate over the entire pH range as the pH is raised from 3.5 to 4.5. By multiplying the activity of the recovered material with the weight of the recovered material at a given pH value, the total recovered activity at this pH value can be computed. The percentage recovery (yield) of corticotrophin activity at this pH value is obtained by dividing the total recovered activity by the total activity contained in the crude starting material used to make up the solution. The percentage recovery of corticotrophin activity at each pH value over the pH range 3.5 to 4.5 is illustrated by the graph of Fig. 3, which in effect is a combination of the graphs of Figs. 1 and 2. It will be observed from Fig. 3 that while satisfactory recovery by present standards was obtained over the entire pH range of 3.5 to 4.5, extremely high recovery was obtained at a pH of from about 4.1 to 4.2.

After adsorption of the corticotrophin activity upon the mixture of oxycellulose and cation exchange resin, the oxycel-resin mixture is eluted with 0.1 N HCl allowing about 15 hours for the first elution and at least two hours for subsequent elutions. Each eluate, as it is collected, is poured into a large volume of cold acetone, and is then left in a cold room to settle. When the precipitate has settled, the acetone is decanted and the precipitate collected, washed with acetone, and finally dried with ether to provide a purified ACTH, or corticotrophin, in almost quantitative yields from the crude material insofar as corticotrophin activity is concerned.

The invention is further illustrated by the following examples of practice:

EXAMPLE I 100 grams of acetone-dried anterior pituitary hog lobes were ground in a Waring Blendor with enough anhydrous acetone to cover them. After grinding the pituitaries in the acetone for about one minute, the pulp was extracted for twenty minutes at room temperature with an extraction mixture prepared from 2100 ml. of acetone, 860 ml. of $H_2O$, and 100 ml. of 2 N HCl. The mixture during extraction was agitated with a "Vibromixer" (a stirring device sold by the Fisher Scientific Co., 717 Forbes Street, Pittsburgh, 19, Pa.). The resultant solvent mixture had an acetone concentration of about 70%. The pH of the solution was approximately 1.5. The mixture was then heated to boiling in a round-bottom flask fitted with a condenser, using a heating mantel. After the mixture was vigorously boiling, it was refluxed for five minutes and the flask was then cooled immediately with cold running water. The contents of the flask were then centrifuged and the supernatant solution was placed in a refrigerator while the residue was again extracted for 10 minutes at room temperature with an extraction mixture of 1380 ml. of acetone, 570 ml. of $H_2O$ and 10 ml. of 2 N HCl. This extraction mixture was centrifuged and the supernatant solution was combined with the first supernatant while the residue was discarded. To the combined supernatants, three grams of decolorizing charcoal (Darco-KB) were added and the suspension was agitated for thirty minutes with the Vibromixer. The charcoal was treated just prior to use by suspending the amount required in water in an Erlenmeyer flask and saturating it with $H_2S$. The charcoal was then washed once with water, sucked free of excess water, and added moist to the supernatant corticotrophin solution. Ten grams of a filter aid ("Celite") were then added to the solution while agitating with the Vibromixer, and the resulting suspension was filtered through a filter paper (Whatman 54) which had been coated lightly with fine filter aid (Celite Analytical, or Filtercel) and then with a thin coat of coarse filter aid (Celite 545). The coarse filter aid was washed twice by suspending in water and decanting before use.

To the filtered and decolorized solution, 11 grams of zinc acetate in 120 ml. of $H_2O$ were added slowly through a fine orifice tube which had been precoated with an anti-wetting agent (Desicote) to prevent adhesion of water. The solution was well agitated by the Vibromixer during the addition of the zinc acetate solution. After addition of the zinc acetate, about 35 ml. of 1 NaOH solution were slowly added through the fine orifice tube while the solution was continuously agitated to insure even and rapid distribution of the reagents. By this means the pH of the solution was slowly brought to pH 4.45. A very accurate pH measurement was made by means of a pH meter standardized against a pH 4.00 buffer. The resulting zinc-protein complex precipitate was centrifuged off at room temperature. To the supernatant solution were added 67 ml. of 1 N NaOH, again through the fine orifice tube and with agitation by the Vibromixer in order to bring the pH to pH 5.85. The pH determination was made by means of a pH meter standardized against a buffer of a pH of 6.00. The mixture was then left overnight in the cold at 0° C. The corticotrophin zinc complex precipitate was collected the next morning by centrifugation at 0° C. The precipitate was suspended in acetone and filtered through a 5″ sintered glass filter covered with filter paper (Whatman 54). The filter cake was washed with acetone four times, care being taken not to allow the cake to be sucked dry. It was then washed three times with small quantities of ether, care being taken not to disturb the cake once it had formed. After the cake was sucked free of excess solvent, it was transferred to a crystallizing dish and was dried in air by breaking it up with a spatula while a current of air was drawn over the top of the dish. A yield of crude corticotrophin in the form of a white powder of approximately 25 grams was obtained. The process was repeated with the results shown in the following tables:

Table 1

YIELD AND POTENCY OF CRUDE CORTICOTROPHIN

[Fresh weight anterior lobes=5.47×acetone-dried wt.]

| Weight acetone-dried anterior lobes pituitary, g. | Weight yield crude, g. |
|---|---|
| 100 | 20.52 |
| 200 | 57.30 |
| 100 | 28.00 |
| 100 | 29.60 |
| 100 | 23.60 |
| 100 | 25.60 |

Mean yield=26.2 g. crude ACTH/100 g. having an activity of 1.22 I.U. mg.—25%.

Table 2

YIELD AND POTENCY OF CRUDE CORTICOTROPHIN

[Fresh weight anterior lobes=5.47×acetone-dried weight]

| Weight acetone-dried anterior lobes pituitary, g. | Weight yield crude, g. |
|---|---|
| 50 | 14.33 |
| 50 | 9.90 |
| 50 | 12.95 |
| 50 | 10.00 |

Mean yield 11.79 g. ACTH from 50 g. acetone-dried anterior lobes having an activity of 1.66 I.U. per mg.±25.8%.

Table 3

YIELD AND POTENCY OF CRUDE CORTICOTROPHIN

| Weight acetone-dried anterior lobes pituitary, g. | Weight yield crude, g. |
|---|---|
| 4,050 | 750 |

Yield was 750 g. ACTH having an activity of 1.96(2.70–1.42) I.U./mg.

EXAMPLE II

Forty grams of crude corticotrophin, prepared as described in Example I, and having a potency of 1.15 I.U./mg. (±28.6%) were dissolved in 2 liters of 0.1 N acetic acid. The pH of the solution was lowered to within the pH range 3.5 to 4.5 by the addition of 35 ml. of glacial acetic and 15 ml. of 1 N HCl, while continuously agitating the solution. The resulting solution was filtered through a Whatman 54 paper, and to the filtrate 16 grams of slurried oxycellulose-carboxylic acid cation exchange resin in 0.1 N acetic acid were added while mixing with a Vibromixer. Agitation was continued for 25 hours at room temperature. The oxycel-resin slurry was prepared by suspending about 8 grams of oxycellulose and 8 grams of Amberlite XE–97 resin in two liters of $H_2O$, settling for one hour, pouring off the supernatant, and washing the mixed settled solids on a filter with water. Following the water wash, the mixture was given three washings with 1 N HCl. The mixture on the filter paper was then covered with 300–400 ml. of 1 N HCl and was agitated in the filter with a Vibromixer for about one hour, allowing the HCl to drop through the filter. The remaining HCl was then sucked off and the activated material was washed twice with water and then once with 0.1 N acetic acid. The activated mixture of oxycellulose and Amberlite XE–97 was then suspended in 0.1 N acetic acid and transferred directly to the corticotrophin solution to be adsorbed. After adsorption of the corticotrophin by the oxycellulose-resin mixture, the oxycellulose-resin was permitted to settle for one hour, the supernatant decanted completely and re-extracted as before with 8 grams of freshly prepared oxycellulose-resin.

The combined portions of oxycellulose-resin containing the adsorbed corticotrophin were slurried with 0.1 N acetic acid and the resulting mixture poured into a sintered glass filter and washed five times with small quantities of 0.1 N acetic acid. The acetic acid was sucked off in the filter and the precipitate was rinsed quickly with 10 ml. of 0.1 N HCl after which it was suspended in 60 ml. of 0.1 N HCl to which a small amount (0.5 ml.) of .1 N HCl containing dissolved $H_2S$ was added. The oxycellulose resin mixture in HCl suspension was then agitated with the Vibromixer for a period of 15 hours. The extract was then drawn into a small vacuum filter flask. The remaining oxycellulose-resin mixture was again eluted in a similar fashion with two further 30-ml. portions of 0.1 N HCl, each containing a small amount of $H_2S$, as before, at least two hours being allowed for each elution. The oxycel-resin mixture was finally washed with 10 ml. of 0.1 N HCl.

Each eluate, as collected, was poured into 20 volumes of cold acetone and left in a cold room to settle. After two or three hours, when the corticotrophin precipitate had settled, the acetone was decanted and the precipitates were collected on a Whatman 54 paper in a sintered glass funnel. The corticotrophin precipitates were washed three times with acetone, and finally with ether at room temperature. Care was taken not to draw a large volume of air through the moist cake. It was transferred from the filter to a plate and allowed to dry by working it with a small spatula. The yield of purified corticotrophin was 1080 mg. having a potency of 40.42 I.U. per mg. ±34.2% representing approximately 95% yield based on the crude material.

Further quantities of crude material were purified in a similar manner with results as indicated in the following table:

Table 4

YIELDS OF HIGHLY PURIFIED CORTICOTROPHIN FROM CRUDE

| Crude prep No. | Weight and crude activity | Weight and purified activity | Recovery of theoretical, percent |
|---|---|---|---|
| 306C21D__ | 80.0 g. 1.15 I.U./mg. (±28.6%) | 2,380 mg. 24.8 I.U./mg. (±32.5%) | 64.2 |
| 306C21D__ | 20 g. 1.15 I.U./mg. (±28.6%) | 500 mg. 35.32 I.U./mg. (±31.6%) | 76.8 |
| 306C296___ | 40 g. 1.15 I.U./mg. (±28.6%) | (1st adsorption) 1,670 mg. 25.53 I.U./mg. (±49.6%). (2nd adsorption) 100 mg. 6.8 I.U./mg. (3rd adsorption) 220 mg. 13.3 I.U./mg. | 100.5 |

In the case of preparation No. 306C296 the absorption of ACTH from the solution of crude material was repeated a second and third time with fresh additions of oxycel-resin mixture each time. The adsorbent mixtures were then eluted separately. The combined yield of the three fractions was 100.5%.

The activity of both the crude and purified corticotrophin was calculated by the test method developed by McKerns and Nordstrand and reported in the Canadian Journal of Biochemistry and Physiology No. 33, 681–686, 1955, and was confirmed by the Sayres Intravenous Ascorbic Acid Depletion Method as reported in "Endocrinology" volume 42, 379, 1948. The "Standard" for comparison is the "International Standard" which has been adopted by the World Health Organization. One "unit" under the International Standard is defined as equivalent to the potency of 1 mg. of preparation LA-1-A when tested by the method of Sayres et al., supra.

It will be understood that the potency of the crude corticotrophin material will depend somewhat upon the source of the pituitaries, and that the potency of the purified corticotrophin correspondingly will be somewhat dependent upon the potency of the crude starting material. It has been found that the average activity of oxycel-purified corticotrophin in intravenous Sayres units is about 20 I.U. per mg. The present method, starting with the same source material, provides an almost quantitative yield of high quality, light colored product having an activity on the order of 20 to 40 I.U. per mg.

While the foregoing specification sets forth specific steps of the process and the use of specific materials in detail, it will be understood that the details may be varied widely by those skilled in the art without departing from the spirit of the invention.

I claim:

1. A method for obtaining high yields of corticotrophin from animal pituitary glands, comprising: extracting said glands at reflux temperature with an acid solvent mixture containing an organic solvent selected from the group consisting of ethanol and acetone; separating the extract from the insolubles; treating the resulting extract with decolorizing charcoal at a pH below 2.0 to remove blood pigments; raising the pH of the resulting solution and selectively precipitating the active corticotrophin principle with a soluble zinc salt in a pH range of from about 4.4 to 5.9; redissolving said corticotrophin precipitate in dilute acid solution; adsorbing corticotrophin from said acid solution on a mixture of oxycellulose and cation exchange resin containing functional carboxylic acid groups; and eluting the absorbed corticotrophin from said adsorbed mixture with a dilute acid solution.

2. A method for obtaining high yields of corticotrophin from animal pituitary glands, comprising: extracting said glands with a solvent mixture containing at least about 65% of an organic solvent selected from the group consisting of ethanol and acetone at a pH in the range of from 1 to 3 and at the reflux temperature of the solvent; separating the extract from the insolubles; decolorizing said extract with charcoal at a pH below about 2.0; selectively precipitating corticotrophin from the decolorized extract with a soluble zinc salt at a pH in the range of 4.45 to 5.85; redissolving said corticotrophin precipitate in dilute acid solution; adsorbing corticotrophin from said acid solution on a mixture of oxycellulose and cation exchange resin containing functional carboxylic acid groups at a pH in the range of about 3.5 to 4.5; eluting the adsorbed corticotrophin from said adsorbent mixture with a dilute acid solution; and precipitating a highly active corticotrophin from the eluate by pouring said eluate into a cold, organic solvent which will cause precipitation of corticotrophin.

3. A method for isolating corticotrophin from animal pituitary glands, comprising: extracting the ground glands with a solvent medium containing at least about 65 percent of an organic solvent selected from the group consisting of ethanol and acetone at a pH in the range of from about 1 to 3, and at the reflux temperature of the solvent; separating the extract from the insolubles; decolorizing said extract with charcoal at a pH below about 2.0; adding a soluble zinc salt to the decolorized extract and raising the pH of the extract to about 4.45 to selectively precipitate proteins other than corticotrophin; separating said precipitate from the supernatant solution; raising the pH of said supernatant solution to about pH 5.85 to precipitate corticotrophin as a zinc complex; and recovering the crude corticotrophin precipitate from said solution.

4. A method for isolating corticotrophin from animal pituitary glands, comprising: extracting said glands at reflux temperature with an acid solvent medium containing an organic solvent selected from the group consisting of ethanol and acetone; separating the extract from the insolubles; adding a soluble zinc salt to said extract and raising the pH of the extract to about 4.45 to selectively precipitate proteins other than corticotrophin; separating said precipitate from the supernatant solution; raising the pH of said supernatant solution to about pH 5.85 to precipitate corticotrophin; and recovering the crude corticotrophin precipitate from the solution.

5. A method for purifying a crude acid organic solvent extract of animal pituitary glands containing corticotrophin and blood pigments, comprising: adsorbing said blood pigments from said extract without substantial adsorption of corticotrophin by contacting said extract with decolorizing charcoal at a pH below about 2.0.

6. The method as defined in claim 5, wherein said decolorizing charcoal is pretreated with hydrogen sulfide prior to adsorption of said blood pigments to thereby insure reducing conditions during said adsorption operation.

7. A method for isolating crude corticotrophin from an acid organic solvent extract of animal pituitary glands, said extract containing corticotrophin and other soluble principles of pituitary, comprising: adding a water-soluble zinc salt to said acid extract and precipitating proteins other than corticotrophin from said extract at a pH below 4.45; removing said precipitate from solution, raising the pH of said solution to about pH 5.9 to selectively precipitate said corticotrophin in the pH range of about 4.45 to 5.9; and removing said corticotrophin precipitate from solution.

8. A method for purifying crude corticotrophin, comprising: adsorbing said corticotrophin from an acid solution at a pH of about 3.5 to 4.5 upon a mixture of oxycellulose and cation exchange resin containing functional carboxylic acid groups; and eluting the adsorbed corticotrophin from said adsorbent mixture with a dilute acid solution.

9. The method of claim 8 wherein said oxycellulose and cation exchange resin are present in the adsorption mixture in proportions of about one to one by weight.

10. A method for purifying crude corticotrophin, comprising: adsorbing said corticotrophin from an aqueous solution at a pH within the range of from about 3.5 to 4.5 upon a mixture of oxycellulose and cation exchange resin containing functional carboxylic acid groups; eluting the adsorbed corticotrophin from said adsorbent mixture with an acid solution and precipitating a highly active corticotrophin from said eluate with acetone.

11. The method for purifying crude corticotrophin as defined in claim 10 wherein said adsorption is carried out at a pH of about 4.1 to 4.2.

12. A method for obtaining high yields of highly active corticotrophin from animal pituitary glands, comprising; extracting said glands with a solvent mixture containing about 65 to 80 percent of an organic solvent selected from the group consisting of acetone and ethanol at a pH of about 1.5 and at the reflux temperature of the solvent; separating the resultant solution from the proteinaceous residue; decolorizing the resultant solution at a pH below about 2.0 with decolorizing charcoal to thereby selectively remove blood pigments; adding an aqueous solution of a water-soluble zinc salt to the decolorized extract; gradually raising the pH of the resultant solution to about 4.45 to precipitate growth hormone and other principles of pituitary; separating the supernatant solution from the precipitate; gradually increasing the pH of said solution to about pH 5.9 to precipitate crude corticotrophin as a zinc complex; removing the zinc complex of corticotrophin from solution; dissolving said corticotrophin complex in acid solution and adjusting the pH of said solution to about 3.5 to 4.5; adsorbing the active corticotrophin from said acid solution upon a mixture of oxycellulose and carboxylic cation exchange resin; eluting the adsorbed corticotrophin from said mixture of adsorbents with a dilute acid solution; and precipitating the corticotrophin from such solution by pouring said eluate into a cold organic solvent which will cause precipitation of corticotrophin.

13. The process as defined in claim 12, wherein said decolorizing charcoal is pretreated with hydrogen sulfide to insure reducing conditions during the decolorizing step and thereby prevent oxidation of the corticotrophin.

14. The process as defined in claim 12, wherein said mixture of oxycellulose and carboxylic acid cation exchange resin is freshly regenerated with a dilute acid prior to adsorbing said corticotrophin.

References Cited in the file of this patent

Payne: J. Biol. Chem., vol. 187, No. 2, December 1950, pp. 719–723.

Smith: Proc. Soc. Exptl. Biol. and Med., vol. 79, No. 1, January 1952, pp. 27–30.

Richter: J.A.C.S., vol. 75, April 20, 1953, pp. 1952–1955.

Homan: The Lancet, March 13, 1954, pp. 541 and 542.

Li: J. Biol. Chem., vol. 190, No. 1, May 1951, p. 317.

Kunin: Ion Exchange Resins, 1950, Wiley and Sons, pp. 109 and 114.